United States Patent [19]

Miscovich et al.

[11] E Re. 28,945

[45] Reissued Aug. 31, 1976

[54] METHOD AND APPARATUS FOR EXCAVATING SETTLED BODY OF SOLIDS

[75] Inventors: John A. Miscovich, Orange; John J. Gilbert, San Francisco, both of Calif.

[73] Assignee: Marcona Corporation, San Francisco, Calif.

[22] Filed: Mar. 10, 1975

[21] Appl. No.: 556,704

Related U.S. Patent Documents

Reissue of:

[64] Patent No.: 3,799,614
Issued: Mar. 26, 1974
Appl. No.: 283,309
Filed: Aug. 24, 1972

[52] U.S. Cl. ..... 299/17; 37/195; 299/18

[51] Int. Cl.[2] ..... E21C 45/00

[58] Field of Search ..... 299/17, 18; 302/14–16; 37/57–63, 195

[56] References Cited

UNITED STATES PATENTS

| | | | |
|---|---|---|---|
| 552,856 | 1/1896 | Roach | 37/63 |
| 931,057 | 8/1909 | Goldsmith | 299/17 X |
| 1,851,565 | 3/1932 | Claytor | 299/17 X |
| 3,311,414 | 3/1967 | Cannon et al. | 299/18 |
| 3,439,953 | 4/1969 | Pfefferle | 299/17 |

FOREIGN PATENTS OR APPLICATIONS

| | | |
|---|---|---|
| 836,705 | 6/1960 | United Kingdom |

*Primary Examiner*—Ernest R. Purser
*Attorney, Agent, or Firm*—Flehr, Hohbach, Test, et al

[57] ABSTRACT

Method and apparatus for excavating and removing a settled body of discrete mineral solids (e.g., a tailings pond from a mining operation) by procedures which progress downwardly from the surface of the body. High pressure streams of liquid are traversed along a path in a pulping zone lowermost in first region of the body. The liquid forms a pumpable slurry with the mineral solids in the zone, and the slurry is then pumped from the zone leaving an undercut cavity sufficient to cause collapse of the overburden of solids. The collapsed overburden is then formed into additional pumpable slurry which is removed by pumping. Successive stages of excavation are carried out by moving the streams of liquid downwardly to a second region where the foregoing steps are repeated. In the apparatus a caisson is disposed vertically in the body and stabilized by means of a plurality of circumferentially positioned pilings. A plurality of high velocity nozzles are mounted in the caisson to direct liquid streams into a pulping zone surrounding the caisson. The slurry which is formed in the pulping zone flows through portals in the caisson into a slurry sump in the lower end of the caisson where a pump removes the slurry through a discharge line leading from the caisson. In one embodiment the caisson is fixedly secured to the caisson and jets are provided to direct liquid streams into regions below the lower ends of the caisson and pilings to sink the apparatus downwardly to the next lower region for additional stages of excavation. In another embodiment, the caisson is mounted for relative vertical movement with respect to stationary pilings.

21 Claims, 7 Drawing Figures

METHOD AND APPARATUS FOR EXCAVATING SETTLED BODY OF SOLIDS

Matter enclosed in heavy brackets [ ] appears in the original patent but forms no part of this reissue specification; matter printed in italics indicates the additions made by reissue.

CROSS-REFERENCES TO RELATED PATENTS AND APPLICATIONS

Reference is made to the following patents issued Sept. 20, 1971: U.S. Pat. No. 3,606,036 entitled "Method and Apparatus for Shipping Mineral Solids and Other Particulate Matter," U.S. Pat. No. 3,606,038 entitled "Ore Carrier with Slurry Repulping and Unloading System," U.S. Pat. No. 3,606,479 entitled "Method and Apparatus for the Storage and Pulping of Mineral Ores and Comparable Particulate Matter;" and to application Ser. No. 213,363 filed Dec. 29, 1971 entitled "Liquid Jet Nozzle;" all of said patents and applications are assigned to the present assignee.

BACKGROUND OF THE INVENTION

This invention relates in general to material excavation method and apparatus, and in particular relates to method and apparatus for the excavation and removal of a settled body of discrete mineral solids such as a tailings pond from an ore mining operation or any other settled body of material which may be constrained by any means such as a large container or vessel and the like.

The mineral or ore solids which are normally discharged as waste products from mining operations and the like must be disposed of in a suitable manner. It is present practice in a mining operation to deposit the tailings or waste mineral solids from operations such as ore dressing into a tailings pond which may be a dammed up area near the mining operation. The tailings pond contains the tailings in a substantially homogeneous mass of water and mineral solids. After a period of time, this mass settles into a semi-rigid body of discrete mineral solids as a certain percentage of the water is expelled.

For various reasons including the fact that tailings ponds of the above nature contain minerals of sufficient value to justify economic recovery, or exist above unmined ore bodies that cannot be mined with the tailings pond in place, or are so located as to endanger entire communities should the associated retaining dam break loose and the tailings ponds begin to flow, it is desirable to excavate, remove, and transport away the mineral solids from the pond. Present techniques such as clam shelling or dredging are limited in their ability to do this work. In the above-identified patents, in particular U.S. Pat. No. 3,606,479, there are disclosed methods and apparatus for the handling of particulate material in which a settled body of the material is removed by the action of fluid jets mounted for operation in the lower-most region of the containing vessel, such as a ship's hold. However, these methods and apparatus are not applicable to excavation operations which can be carried out from the surface of the settled body and progress downwardly in stages to the required depth. Accordingly, the need has been recognized for improved method and apparatus which is effective in excavating and removing a settled body of mineral solids of the above nature.

OBJECTS AND SUMMARY OF THE INVENTION

It is a general object of the invention to provide improved method and apparatus which is applicable to removing a portion or all of a settled body of material such as discrete mineral solids which may be confined in the form of a pond or within a large container or vessel and the like.

Another object of the invention is to provide method and apparatus of the above character in which overlying regions of a body of material such as mineral solids are removed in sequential stages proceeding downwardly from the surface by pulping a lowermost zone of each region with liquid into a slurry which is pumped away to form an undercut cavity sufficient to cause collapse of the overburden and with the overburden in turn pulped into a slurry and pumped away.

Another object of the invention is to provide method and apparatus of the above character which is applicable to excavating and removing a settled body of material such as the mineral solids in a tailings pond by means of a caisson apparatus which is partially submerged into the body and which carries nozzles adapted to direct high velocity liquid streams into a pulping zone of an upper region to be excavated, in which the liquid forms a pumpable slurry with the solids with the slurry flowing through portals in the caisson for removal by pumping, and in which the caisson apparatus is moved downwardly for additional stages of excavation in the lower regions of the body.

The foregoing and additional objects and features of the invention are provided in the method wherein superposed regions of a settled body of material, such as the ore solids in the tailings pond of a mining operation, are excavated, removed and transported away for subsequent disposition. The regions of the body are excavated in step-by-step stages progressing downwardly from the surface to the bottom of the pond or other container. The steps are then repeated, as necessary, at another location in the pond until the desired amount of material is removed.

In each region streams of high velocity liquid are directed along paths in a lowermost pulping zone so that the liquid forms a pumpable slurry with the solids within the zone. The slurry is pumped away and the pulping action continues until an undercut cavity is formed sufficient to cause collapse of the overburden. The liquid streams form additional slurry with the collapsed overburden which is also pumped away. Following this the streams of liquid are moved downwardly to the next underlying region where the foregoing steps are repeated until the mineral solids within the latter region are excavated and removed.

In the apparatus an elongate caisson is partially submerged in the body of solids with its longitudinal axis disposed vertically and with its lower end extending below the upper surface of the body to a depth which corresponds to the depth of the region to be excavated. A plurality of nozzles are mounted within the caisson to direct high velocity liquid streams through paths which extend outwardly into the pulping zone. Portal means are formed in the caisson to direct the flow of slurry into a sump. Pump means in the caisson pumps the slurry from the sump through discharge conduits leading to an installation or storage area remote from the pond. A plurality of circumferentially positioned pilings are provided to stabilize and position the caisson. In one embodiment both the caisson and pilings sink downwardly as a unit through the pond, while in another embodiment the pilings are stationary and the caisson is raised and lowered relative to the piling. Jet means are provided to sink the caisson by directing streams of liquid into regions underlying the lower ends of the caisson and pilings in the first mentioned embodiment, or into the region underlying only the caisson in the second embodiment.

These and other objects and features of the invention will become apparent from the following description and claims in which the preferred embodiment is set forth in detail when taken in conjunction with the accompanying drawings.

DESCRIPTION OF THE PREFERRED EMBODIMENTS

Figure 1:
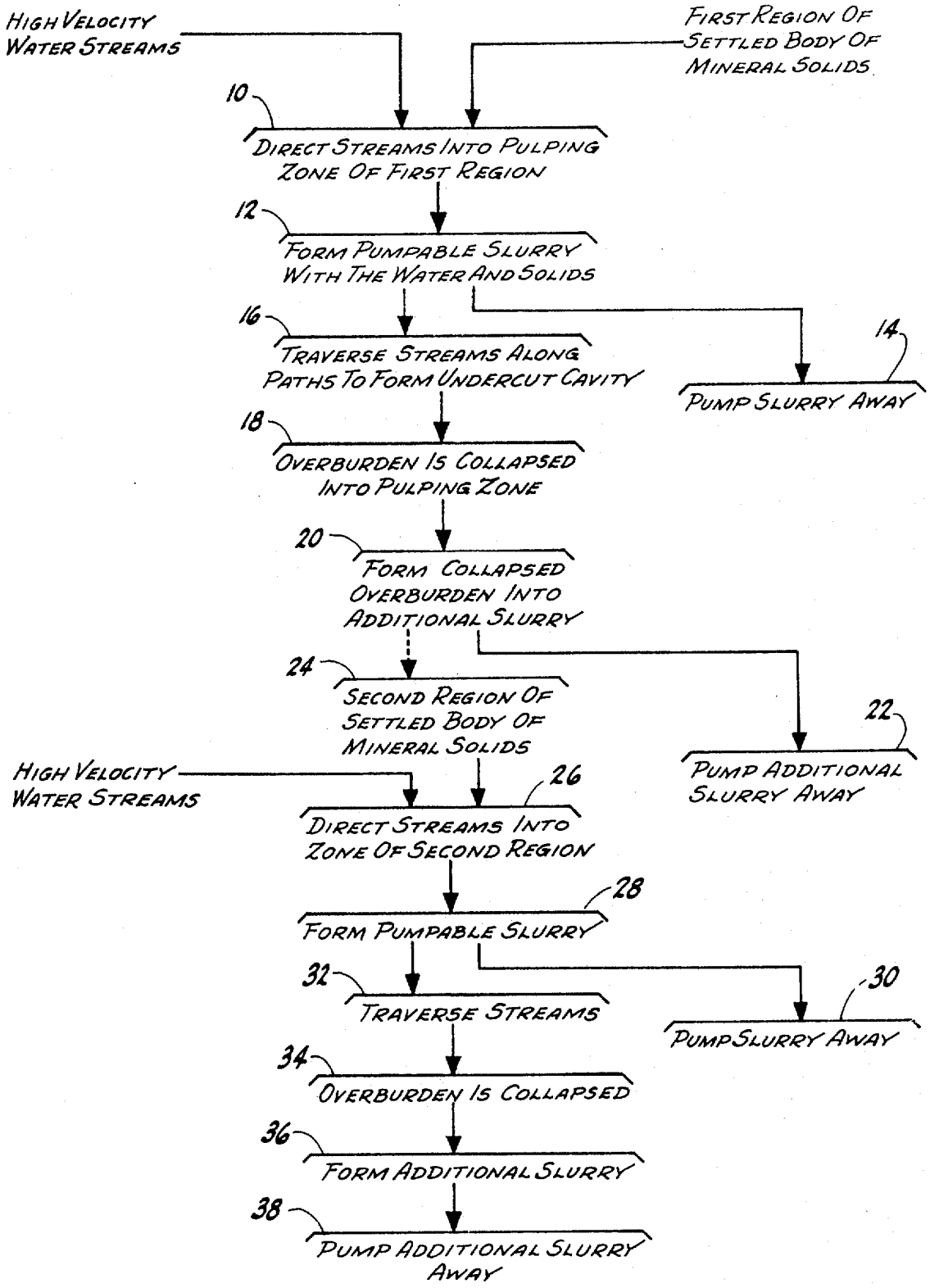
FIG. 1 is a flow diagram illustrating the procedure for carrying out the present invention.

In the drawings FIG. 1 shows a flow sheet illustrating the method of the present invention applied in the excavation and removal of a settled body of material such as discrete mineral solids, e.g., iron, copper or molybdenum ore filtrates, muds or waste residue and the like. While the method of the invention will be described as carried out by apparatus specially adapted for excavating a tailings pond associated with a mining operation, it is understood that the invention has broad application in the excavation and removal of other settled bodies of solids of this nature, such as a body of material solids confined by other means which could comprise a large container or vessel of any type, and in which the solids are adapted to be formed into a pumpable slurry. The above identified issued patents contain details of the types, sizes and characteristics of mineral solids of this nature which are capable of being excavated and removed by the method and apparatus of the present invention. The term mineral solids as used herein includes ores, dressed ores and all other particulate matter and ore products capable of being pulped into a pumpable slurry.

In the method a region of the solids body is selected for the first stage of excavation. High velocity streams of liquids, which preferably would be water although other suitable non-aqueous liquids could be used, are directed in step 10 into a pulping zone at the bottom of the first region which is established at a predetermined elevation below the upper surface of the body. The water streams or jets impact with the solids which are caused to break up and disperse for suspension in the water as a slurry in step 12. This slurry is pumped away from the pulping zone at step 14 for transport to a subsequent processing operation remote from the settled body. The streams are transversed along predetermined paths in step 16, such as back and forth traversing through individual arcs extending across the pulping zone, and the action of the water progressively breaks up and disperses the solids within the area of influence of the streams. Simultaneous pumping and removal of the slurry thus formed progressively extends the area of influence of the streams so that an undercut cavity is gradually formed in the first region. The foregoing steps continue at step 18 until the overburden of solids above this cavity is caused to collapse by its own weight and fall into the pulping zone. The water streams are continually traversed along their paths at step 20 so as to form additional slurry with the solids of the overburden which has collapsed into the pulping zone. This additional slurry is then pumped away at step 22. The action of the water streams and slurry pumping is continued until the desired volume of solids is removed from the first region.

Following the first stage of excavation, the second stage is initiated, as required, for excavating and removing the solids in a second region at 24 underlying the first region. In the second stage high velocity water streams or jets are established in step 26 and directed into a pulping zone located at the bottom of the second region. Following this the remaining steps described for the first stage are repeated. Thus, a pumpable slurry is formed in step 28, and this slurry is pumped away in step 30. In step 32 the streams are traversed to form an undercut cavity in the second region, and in step 34 the overburden is collapsed. The collapsed overburden is formed into additional slurry in step 36, and this latter slurry is simultaneously pumped away in step 38, with these steps continuing until the desired volume of solids is removed from the second region.

It will be seen that the number of stages of operation of the described steps required to excavate a given portion of the solids body will be determined by various factors including the depth at which the water streams are established in each region, and the overall depth of the solids body. Following excavation of the overlying regions to the bottom of the body, e.g., the floor of a tailings pond, the operation would be repeated in other locations of the pond depending upon the area size of the body and the amount of solids desired to be removed from the body.

Figure 2:
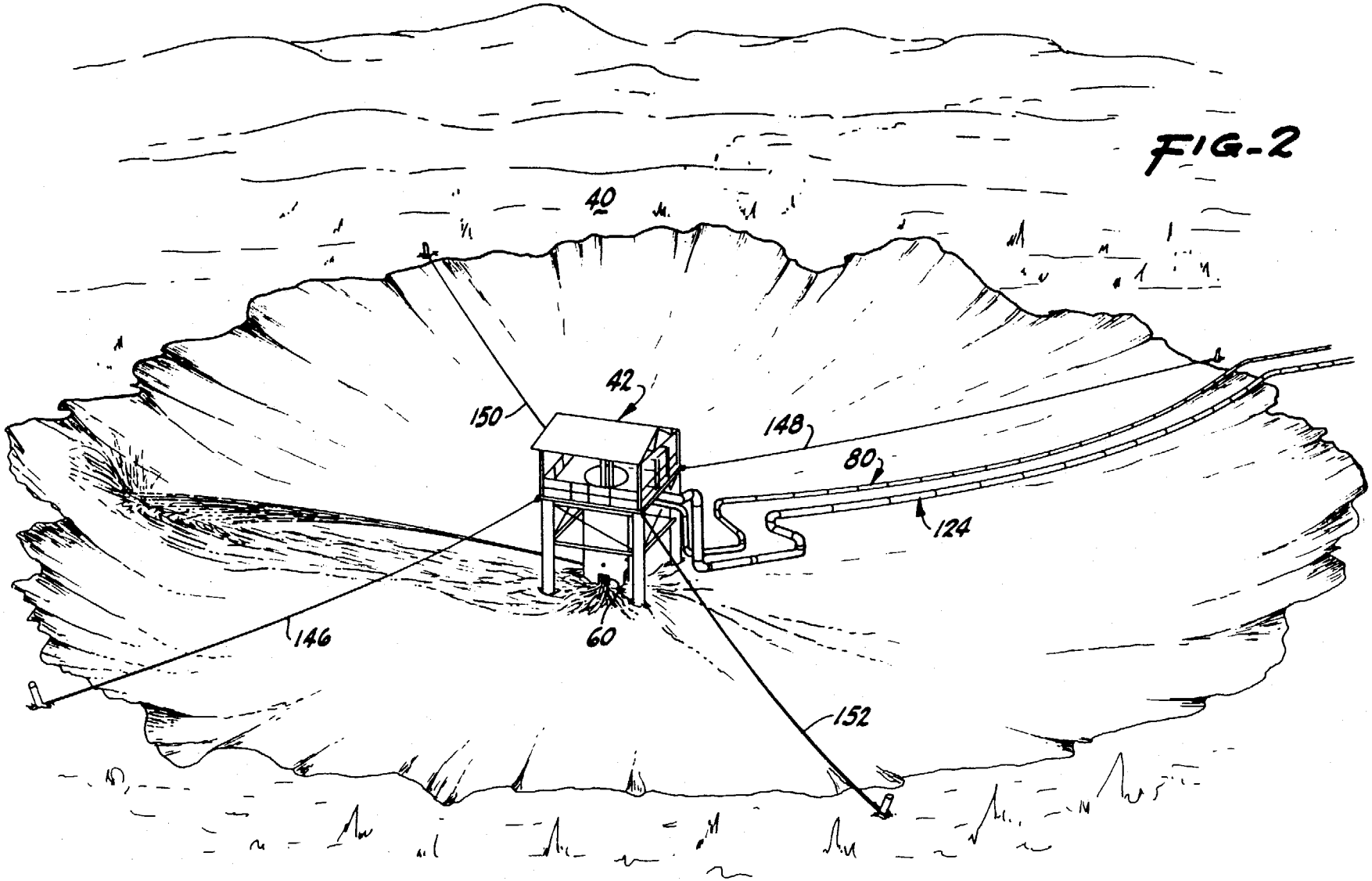
FIG. 2 is a perspective view of a mineral ore tailings pond undergoing excavation by caisson excavator apparatus constructed according to one embodiment of the present invention.
Figure 3A:
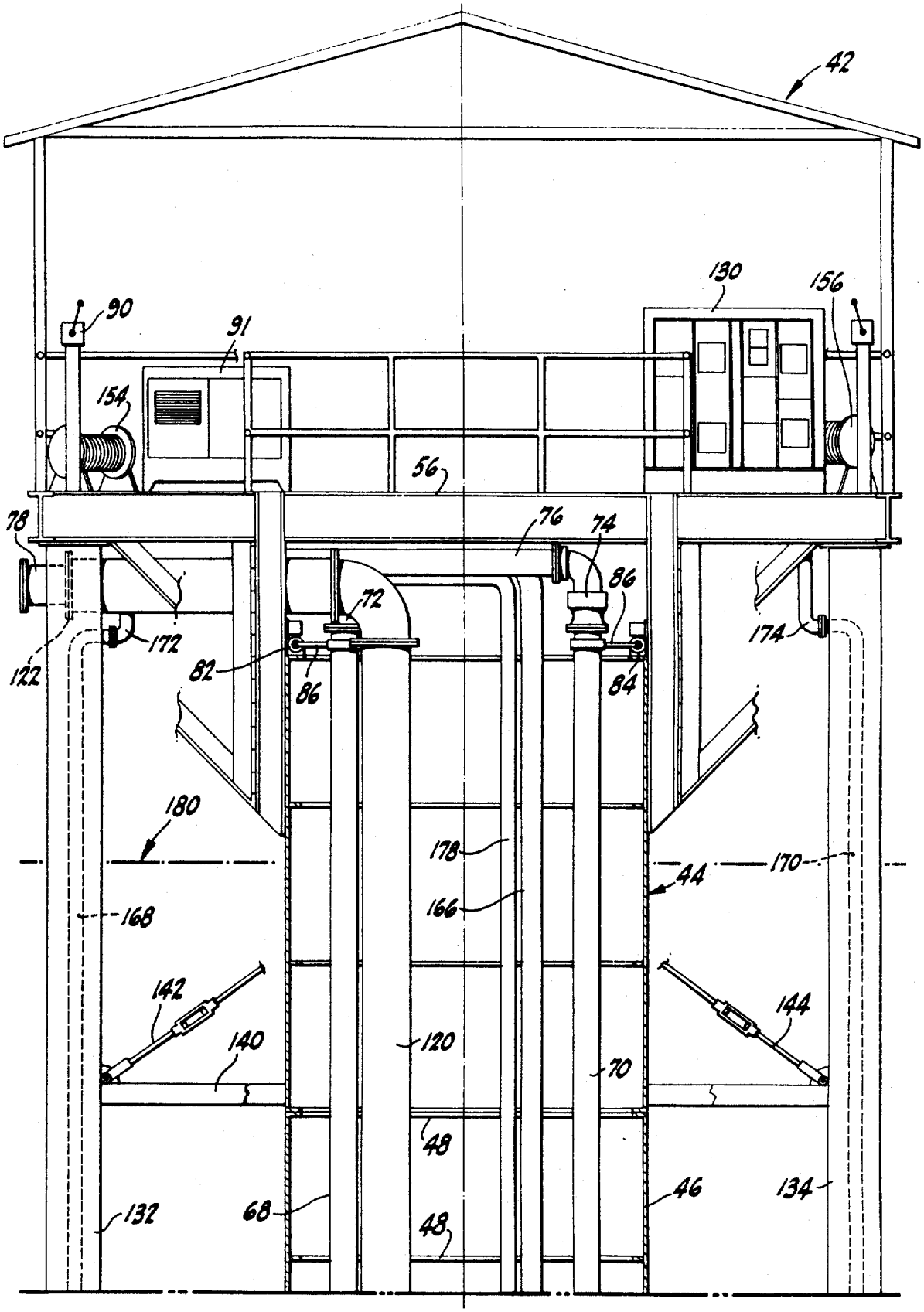
FIGS. 3A and 3B comprise an enlarged elevational view, partially in longitudinal section and partially broken away, of the caisson excavator apparatus of FIG. 2.
Figure 3B:
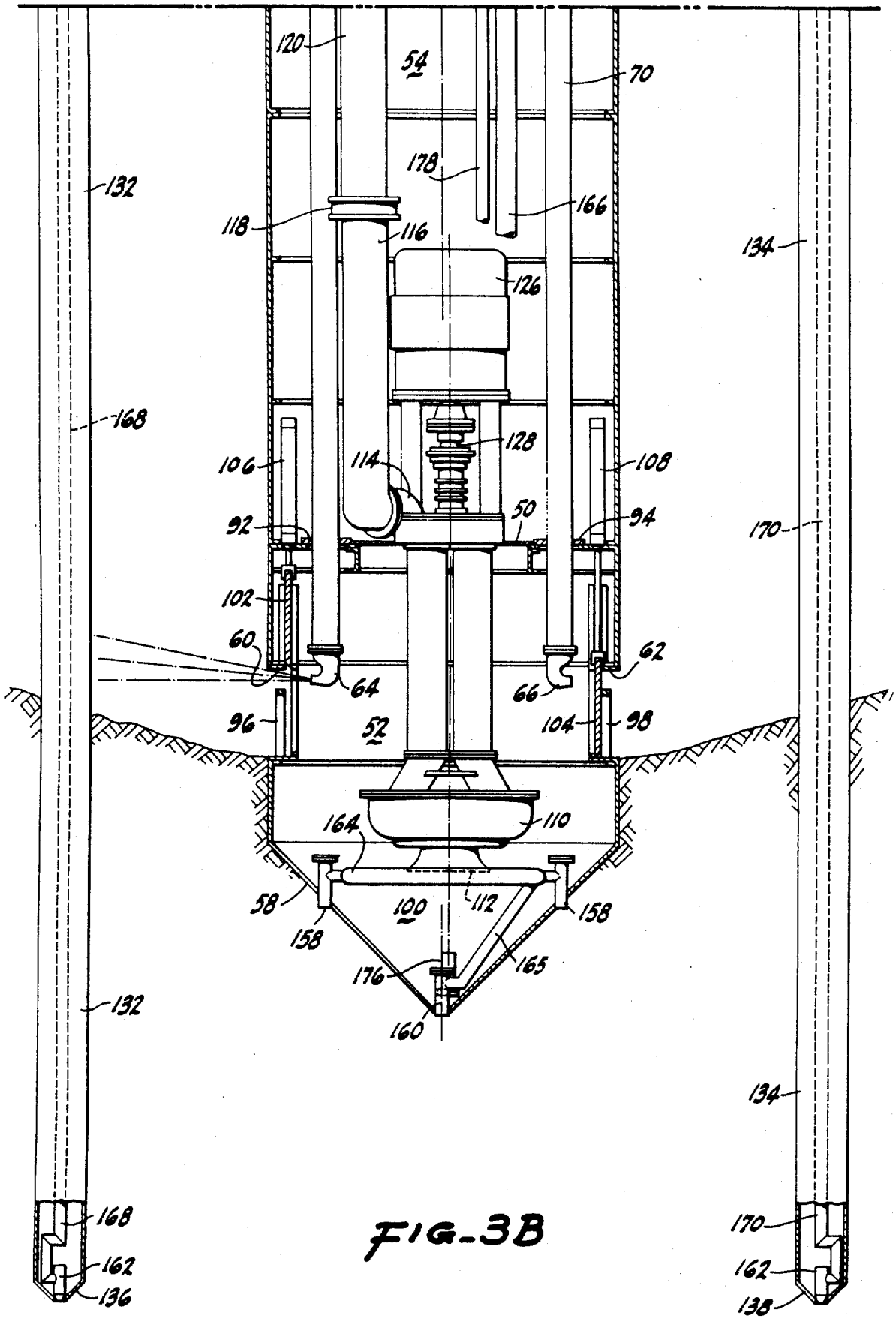

In FIGS. 2, 3A and 3B, there is shown as one embodiment suitable apparatus for carrying out the invention in the excavation of a settled body of mineral solids comprising a tailings pond 40 associated with a mining operation. The tailings pond would typically comprise a dammed up area of land which contains, for example, the tailings or waste ore discharged from an ore dressing operation. The tailings body generally is an homogeneous mixture of ore particulate matter and water and is characterized in having low compression and shear strength and very high viscosity.

In the embodiment of FIGS. 2, 3A and 3B, the excavator apparatus 42 includes a large elongate caisson structure 44 adapted to partially extend into the tailings pond with its longitudinal axis vertically aligned. Caisson 44 comprises an outer shell 46, preferably of a cylindrical configuration, strengthened by means of a plurality of axially spaced ribs 48. The caisson is divided by means of watertight bulkhead 50 into a water jet and pump compartment 52 at the caisson lower end and a watertight upper chamber 54. Caisson shell 46 is mounted to and extends downwardly from a deck structure 56 forming an operator and equipment platform. The lower end 58 of the caisson is conical in shape to facilitate the sinking action of the apparatus in a manner to be described hereafter.

Portal means comprising a plurality, preferably four, of openings 60, 62 are formed in the sidewalls of the caisson shell at the mid portion of the jet and pump compartment 52. Four high pressure water jet nozzles 64, 66 are mounted at 90° orientation within the caisson compartment 52 in a manner to direct streams of high velocity water outwardly through the upper portions of respective ones of the portal openings 60, 62. The nozzles are aimed to direct the jets approximately horizontally, although they could be canted upwardly somewhat. Details of the construction and operation of the nozzles 64, 66 are described in the above mentioned application Ser. No. 213,363.

The high pressure nozzles are adapted to convert a high pressure source of water into a high force water stream or jet with low energy losses for a highly efficient cutting action against the body of mineral solids which surround the caisson. Suitable sensor and water pressure controls as described in said issued U.S. Pat. No. 3,606,479 may be provided for controlling the solid to fluid ratio of the slurry, and to compensate for an increase in peripheral traversing speed of the streams as the working range increases. While nozzles and control arrangements of the type described in said issued patent would be preferred in the present invention, it is understood that other suitable fluid nozzles and controls could be utilized.

The nozzles 64, 66 are supplied by the high pressure water through respective water conduits 68, 70 which are mounted within the caisson shell and extend downwardly from respective swivel joint connections 72, 74. The swivel connections in turn are connected through suitable manifold piping 76 with water inlet connection 78 and inlet supply piping 80 (FIG. 2), which may comprise a series of flexible interconnected pipes affixed to suitable pontoon type supports resting on the surface of the tailings pond. A shore installation, not shown, provides suitable pumping apparatus and the source of supply water for directing water under a pressure of, for example, 300 psi into supply piping 80.

Means are provided to control the direction of the water streams jetting from each of the nozzles, and this means includes a plurality of reciprocating hydraulic actuating cylinders 82, 84 mounted within the caisson and connected through operating arms 86, 88 to swivel the conduits 68, 70, and thereby the individual nozzles back and forth through an arc of rotation. The actuating cylinders are operated under influence of suitable automatic and manually operated hydraulic valves incorporated into a control stand 90 on deck 56 with pressurized hydraulic fluid supplied from suitable pump means contained in power unit 91. Relative rotational movement at the upper ends of piping 68, 70 is accommodated through the swivel joints 72, 74, and at the lower end thereof through suitable ring seals 92, 94 mounted around openings provided in bulkhead 50.

The portal openings 60, 62 are covered at the portion thereof below the arc of travel of the liquid streams by means of suitable grates 96, 98 preferably formed in a grizzly-type construction having a plurality of vertically extending, laterally spaced-apart bars adapted to permit the gravital flow of slurry from around the caisson through the portal openings and down into a sump or pump penstock 100 at the bottom of compartment 52. A plurality of slide gates 102, 104 are mounted within the caisson for vertically sliding movement to selectively cover and uncover the portal openings. The gates are moved up and down by suitable means comprising respective hydraulic cylinders 106, 108 mounted above bulkhead 50 within the sealed chamber 54 and having actuating arms extending through the bulkhead for connection with the gates. The cylinders 106, 108 are actuated by hydraulic pressure under influence of suitable manually operated control valves contained in the control stand 90. Each of the four gates are raised to the position illustrated by gate 102 to permit operation of the main excavating nozzles, and these gates are lowered to the position illustrated by gate 104 where it is desired to close off the flow of slurry into the sump, and at such time operation of the main nozzles 64, 66 would be shut down. In the invention the geometry and relationship of nozzles, portal openings, grates and slide gates facilitate the excavation operation which progressively moves from the surface of the settled body downwardly in stages.

Means is provided for pumping the slurry flowing into sump 100 away from the caisson, and this means comprises a suitable vertical drive slurry pump 110. The pump 110 includes a downwardly and outwardly flaring inlet 112 through which the slurry is raised from the sump. Slurry discharge from the pump is directed upwardly through a discharge conduit 114 extending through an opening in bulkhead 50 into upper chamber 54 where it connects into discharge piping 116. The flow of discharge slurry continues through a one-way valve 118 and piping 120 mounted within the caisson shell and leading into slurry discharge fitting 122 which in turn is connected with suitable flexible discharging piping 124. The discharge piping 124 may comprise a series of flexible interconnected pipes mounted on pontoon-type supports to rest on the surface of the tailings pond. The discharge piping in turn leads to the shore installation for the desired subsequent processing operations.

Slurry pump 110 is powered by suitable means comprising an electric motor 126 mounted within sealed chamber 54 and connected with the pump through drive shaft 128. This electric motor is operated through suitable automatic and manual controls and switching contained within motor control cabinet 130 on deck 56.

Stabilizer means is provided to stabilize the caisson vertically within the structurally weak settled body and this stabilizer means comprises a plurality, preferably four, of elongate pilings 132, 134 mounted below deck 56 to extend partially into the body. The four pilings are arranged in circumferentially spaced-apart, parallel relationship around the caisson located along radii extending from the caisson between the nozzle positions so that the pilings do not obstruct the path of travel of the liquid streams. Each of the pilings comprise hollow members which may be tubular piping formed at their lower ends with conical caps 136, 138 to facilitate the sinking action of the pilings in a manner to be described hereafter. Suitable means is provided to brace the pilings with the caisson, and this bracing comprises four cross members 140 each extending between an adjacent pair of the pilings, together with a plurality of cables 142, 144.

Four guy lines 146, 148, 150, 152 are provided to afford additional stability for the caisson, and a vertical alignment capability. The guy lines extend from respective ones of four hydraulically operated winches 154, 156 mounted on the four corners of the caisson deck.

Each of the guy lines extend across the excavation cavity where they are anchored by suitable means along the edge of the excavation, as best illustrated in FIG. 2. Operation of the winches 154, 156 as the caisson and pilings are submerged and sink into the tailings pond permits an adjustment or correction of the vertical angle of the caisson. With the caisson stabilized at the desired depth the guy lines are maintained under tension to provide lateral stability.

Means is provided to sink excavator apparatus 42 downwardly in step-by-step increments for successive excavation of the superposed regions in the solids body. This sinking means comprises a plurality of nozzles 158, 160 mounted in the caisson lower end 58, and a plurality of nozzles 60 mounted in respective ones of the four piling end caps 136, 138. The caisson mounted nozzles 158, 160 are arranged to direct water jets or streams downwardly into a region of the solids material adjacent to and underlying the caisson lower end, and these nozzles are arrayed in a pattern providing maximum distribution of water jets to form a pumpable slurry with the solids underlying the caisson. Thus, it is preferred to provide four nozzles 158 arranged at 90° radii about the longitudinal axis of the caisson and with a single nozzle 160 concentrically arranged at the apex of the conical end. Water under high pressure is provided through inlet manifold piping 164 to nozzles 158 and through branch conduit 165 to nozzle 160. The manifold piping 164 is fed by water supply conduit 166 extending down through the caisson shell and connected at its upper end through suitable flow control valve means, not shown, with the piping leading from high pressure water inlet 78.

The piling sink nozzles 162 are arranged to direct high pressure water jets or streams downwardly into regions of the solids material underlying the piling ends. Water is supplied to each of the piling sink nozzles through conduits 168, 170 extending downwardly within the interior of respective pilings and connected at their upper ends through suitable supply conduits 172, 174 and flow control valves, not shown, leading from high pressure water inlet 78. The flow control valves for both the caisson sink nozzles and piling sink nozzles are operated by means of suitable manual controls accessible from deck 56.

A pump flushing nozzle 176 is mounted within the lower end of the caisson to direct a high pressure water jet or stream vertically upwardly through the approximate center of slurry sump or penstock 100 and into the throat of pump inlet 112. Water is supplied to the flushing nozzle 176 through a supply conduit 178 extending downwardly through the caisson shell and connected at its upper end through a suitable flow control valve, not shown, leading from high pressure water inlet 78. The flushing nozzle control valve is selectively actuated for jetting high pressure water into the sump where it is desired to agitate the pulp therein for starting an excavation operation after a period of shut down, and to clear out the sump.

An example of the construction and operation of an application of the first embodiment of the invention as used for excavating a tailings pond associated with a mining operation is as follows: A caisson excavator apparatus is constructed in accordance with the disclosure herein so that the tip of caisson lower end 58 penetrates approximately 36 feet below the original pond surface 180. The depth of the lower edges of portal openings 60, 62 below this surface is 30 feet, and this defines the working depth of the first region to be excavated. The four pilings 132, 134 project downwardly alongside the caisson to a depth of approximately 43 feet below surface 180, thereby providing a penetration for the pilings of approximately 13 feet below the portal openings so that sufficient stability is afforded for the caisson apparatus as the solids excavated from around the caisson to the level of the portals.

The first region of the trailings pond to be excavated is initially prepared for receiving the caisson apparatus by forming a hole, as by clam shelling, with a diameter sufficient to accept the caisson shell. Four smaller peripheral holes for receiving the pilings are formed around the caisson hole by suitable means such as drilling. The caisson apparatus is then lifted, as by an overhead crane, centered over the holes, and dropped therein to the depth for the initial stage of excavation in the first region of the pond. The four guy lines 146–152 are payed out from the winches and anchored at suitable radial distances which would lie outside the perimeter of the pond or cavity area to be excavated. The inlet piping 80 and discharge piping 124 is next installed on the pontoon type supports and connected with the inlet and outlet fittings on the caisson deck. Water under a pressure on the order of 300 psig is directed from the shore installation through the inlet piping and the various supply lines are filled and pressurized.

The first stage of operation is commenced by raising the slide gates 102, 104 and opening the flow valves leading to nozzles 64, 66. High velocity water streams are directed from the four nozzles through the spaces in the portals above grizzlies 96, 98 to penetrate into the solids material surrounding the portals. The water forms a pumpable slurry with the solids and this slurry flows by gravity through the grizzlies and downwardly into sump 100. Pump motor 126 is energized to operate pump 110 which removes this slurry and discharges it through the discharge conduits and piping to the shore installation. The four water streams are traversed back and forth through arcs of travel which extend transversely from the caisson and which together define a pulping zone lowermost of the first region. These streams are traversed by operation of hydraulic actuating cylinders 82, 84 which swivel the associated piping conduit 68, 70 and nozzles. The desired cutting action and penetration into the material, together with the desired ratio of solids to liquid for optimum slurry pumping characteristics, is maintained through control of the traversing speed and pattern of the water streams, and control of the water pressure. The traversing speed is controlled within the range of one-fourth rpm and up to 6 rpm, and the traversing pattern may be controlled so that the streams remain stationary for deeper penetration for a given time followed by a relatively constant rotational speed across to and back from the extreme limit of their arc of travel. This pattern of water stream traversal, forming of the slurry within the pulping zone, and removal of the slurry by pumping progresses so that an undercut cavity is gradually formed which extends outwardly around the periphery of the caisson portals. Eventually this cavity enlarges so that the overburden of material above the cavity collapses and falls by gravity into the pulping zone. Operation of the water streams through their traversing patterns continues so that this collapsed overburden is formed into additional slurry which flows through the portals and into the sump where it is pumped away. These operating steps are continued until the outer limits of the area of influence of the water streams is reached. At this point the caisson apparatus is prepared for sinking to the next lower region for a second stage of excavation by shut down of the valves feeding main nozzle 64, 66.

Caisson apparatus 42 is sunk downwardly into the solids material to the next lower region by opening the flow control valves supplying water into the caisson sink nozzles 158, 160 and piling sink nozzles 162. Water issuing from the caisson sink nozzles forms a pumpable slurry with the material underlying the caisson lower end, and the weight of the caisson is effective to displace this slurry upwardly around the outer surface of the caisson shell where it can flow through the grating of the portal and into sump 100 where it is pumped away. The slurry which is formed below the ends of the four pilings is sufficiently fluid so that the relatively small frontal area of the pilings displaces the slurry material aside as the pilings drop by gravity. Operation of the caisson and piling sink nozzles and sump pumping action continues so that the caisson gradually sinks into the tailings pond, with vertical stability and angular correction being provided through operation of the four guy line winches 146–152. This sinking step continues until the portal openings drop to an elevation or depth on the order of 30 feet from their original position. This dimension thus defines the depth of the second region of the pond to be excavated. Second stage operation is initiated by opening the flow control valves to the main nozzles 64, 66 which are traversed in the manner explained above through their respective arcs of travel into a pulping zone in this second region. The steps of forming and pumping away the slurry in the pulping zone to form an undercut cavity, collapsing the overburden, and forming and pumping away the slurry formed with the overburden are repeated in the manner previously explained until the limits of the area of influence of the water streams are reached in the second region.

When the second region is completely excavated the caisson apparatus is sunk downwardly to successively lower regions which are excavated in further stages of operation until the floor of the tailings pond is reached. Following this the caisson apparatus is moved to another area of the pond which is excavated in the foregoing manner.

Figure 4A:
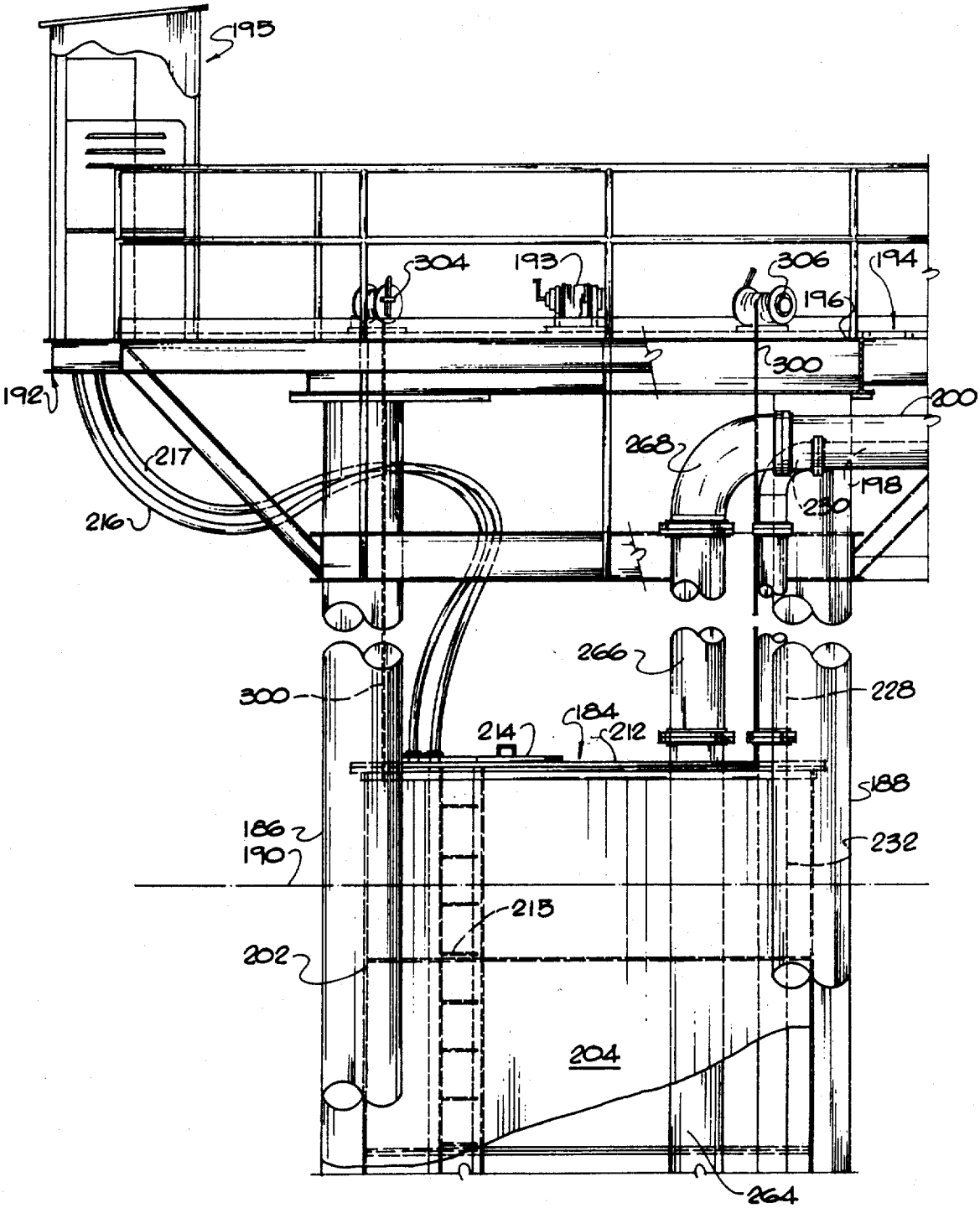
FIGS. 4A and 4B comprise a view similar to FIG. 3 of caisson excavator apparatus constructed according to another embodiment of the invention.
Figures 4B, 5:
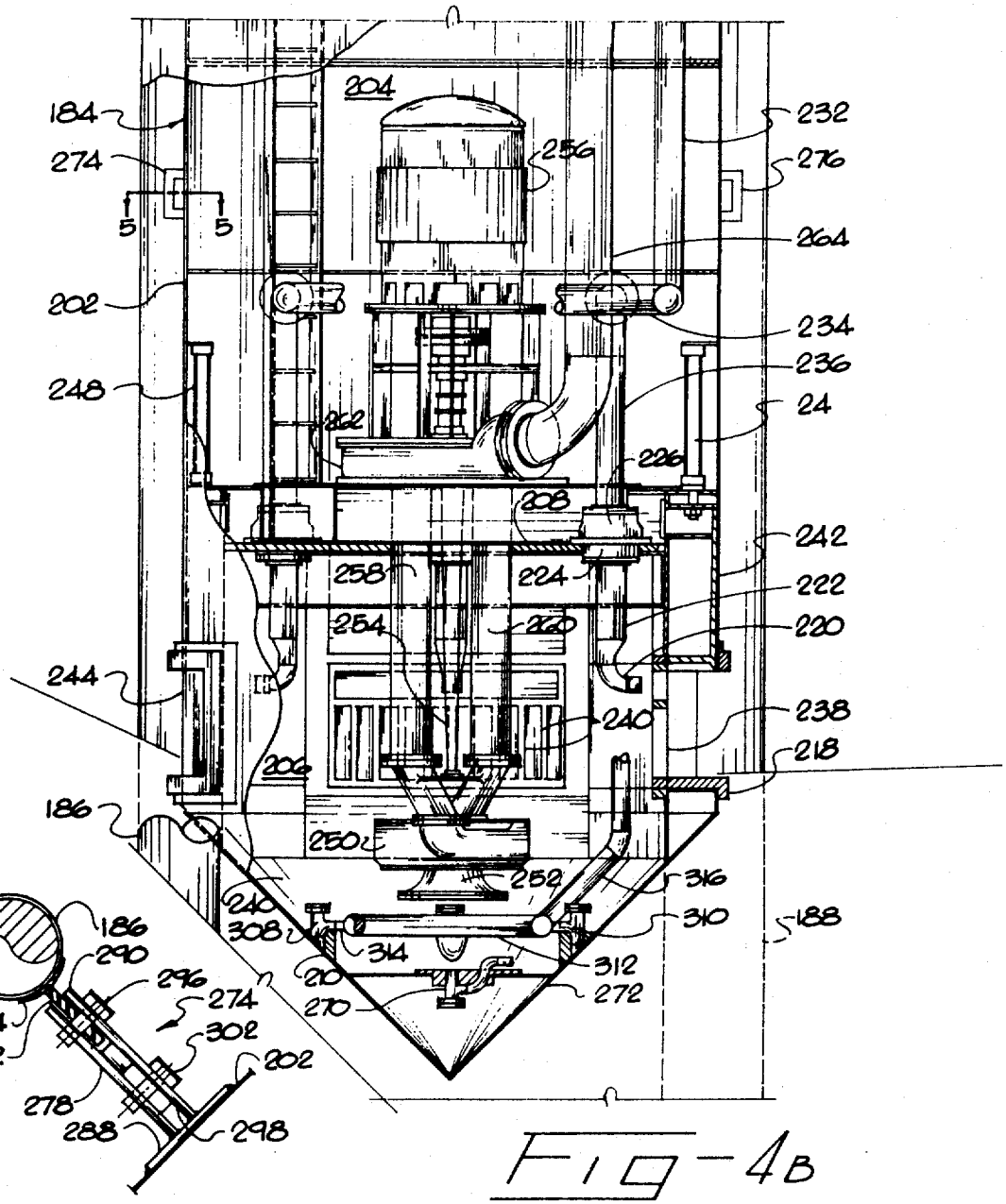
FIG. 5 is a fragmentary cross-sectional view taken along the line 5—5 of FIG. 4.

FIGS. 4–5 illustrate an embodiment of the invention characterized in providing a capsule 184 adapted to be raised and lowered with respect to fixed pilings 186, 188 whereby the excavation operation may be easily controlled, maintenance of the equipment within the capsule is facilitated, and problems associated with the flooding or sedimentation of the capsule are obviated.

A plurality of the pilings, shown as four, comprising steel piping are driven into the body of material, such as a tailings pond, at circumferentially spaced positions about the center of the desired excavation location. These pilings extend into the floor or bedrock formation of the pond and project upwardly above the initial pond surface 190. A service platform 192 is mounted on the upwardly projecting ends of the four piles. A plurality of guy wires and associated guy tensioning winches 193 are mounted on the platform with the ends of the wires anchored around the pond perimeter. The platform also supports a control and hydraulic power unit enclosure 195.

A service bridge 194 is secured at one end to service platform 192 and extends to the perimeter of the pond where it is supported on suitable foundation structure such as a dike, not shown, which would be provided to dam up the tailings pond. Additional support for the service bridge may be provided by driving groups of pipe piles, not shown, into the bedrock to form supporting bents at intermediate locations along the length of the bridge. Service bridge 194 provides access to the service platform for lowering subsections of the capsule through platform opening 196 for assembly between the four piles. Additionally, the bridge provides support for water supply piping 198 and slurry discharging piping 200, and for maintenance and repair access to the service platform.

Capsule 184 comprises a housing structure 202 of cylindrical shell configuration which includes an upper water-tight equipment compartment 204, separated from a lower water-jet and pump compartment 206 by means of a sealed bulkhead 208. The lower end of the capsule is defined by conical shell 210 and the upper end is defined by sealed cover 212 provided with an access opening closed by hatch 214 which leads to ladder 215. Flexible lines 216, 217 provide hydraulic and electrical power and control communication between enclosure 195 and the capsule.

Portal opening means comprising a plurality, preferably four, of openings 218 are formed at spaced-apart positions around the perimeter of jet and pump compartment 206. Four high pressure water-jet nozzles 220, preferably of the construction and operation as described in the above referenced application, Ser. No. 213,363, are mounted at 90° orientation within compartment 206 to direct high velocity water streams outwardly through the upper margins of respective portal openings. Each of the nozzles depend from pipe sections 222 which in turn are sealably mounted for pivotal movement in the packing glands 224 extending through bulkhead 208. Rotary actuated means 226 is mounted within equipment compartment 204 in operating connection with pipe sections 222 for oscillating the respective nozzles and thereby controlling the direction of the water streams jetting from each nozzle. High pressure water is supplied to the nozzles through the inlet piping 198 on the service bridge from a pumping installation at a suitable location remote from the pond. One or more removable sections of piping 228 are connected to inlet piping 198 through elbow fittings 230 and to capsule 184 through supply piping 232 mounted within the equipment compartment. A circular supply manifold 234 is connected with the lower end of piping 232 and feeds supply water into branch pipe sections 236 leading to respective nozzles. One or more of the piping sections 228 leading to the capsule may be installed or removed, as desired, for purposes of lowering or raising the capsule with respect to the service platform.

The portions of portal openings 218 below the arc of travel of the liquid streams are covered by suitable grats 238, preferably of a grizzly-type construction having a plurality of vertically extending, laterally spaced-apart bars 240. The grates receive the gravital flow of slurry from around the capsule through the portal openings and into the sump or pump penstock 240 defined within compartment 206. Each portal opening is provided with a slide gate 242, 244 mounted for vertical sliding movement above a respective opening. The actuating means for each gate comprises four extensible hydraulic cylinders 246, 248 mounted within equipment compartment 204 above each gate position with the actuating rods of the cylinder extending through bulkhead 208 for connection with the gates. With the rods of the actuating cylinders retracted the gates are raised to the position illustrated by gate 242 to permit operation of the associated nozzle. With the rods extended the gates are lowered to the position illustrated by gate 244 for closing off the flow of slurry to the penstock.

Slurry which flows into penstock 240 is removed by a submersible slurry pump 250 having a downwardly facing, outwardly flaring inlet 252 suspended within the penstock and driven by power shaft 254 from electric motor 256 mounted within the sealed equipment compartment. Two outlets from the pump direct the discharge of slurry through piping 258, 260 leading through bulkhead 208 and into outlet manifold 262 which in turn is connected into discharge piping 264 leading upwardly through the equipment compartment. One or more removable sections of the piping 266 are connected between the upper ends of piping 264 and elbow fitting 268 connected to the slurry discharge piping 200. The piping 200 extends along the bridge to shore based piping for delivery to a suitable receiving installation remote from the pond. As the capsule is incrementally lowered additional sections of piping 266 are installed as in the case of the water inlet piping 228, and conversely the discharge sections are removed as the capsule is raised.

Water jet and pump compartment 206 of the capsule is additionally provided with a pump flushing nozzle 270 mounted within the lowermost portion of the penstock and positioned to direct a water jet, under influence of suitable controls provided in enclosure 195 on the service platform, into pump inlet 252 for use during initiation of an excavation operation after a period of shutdown, and to clean out the sump. Water under pressure is supplied to the flushing jet by feed piping 272 and a suitable control valve, not shown, connected with the high pressure water inlet circuit.

Capsule 184 is mounted for vertical movement with respect to the four piles 186, 188 by means of four capsule guide assemblies 274, 276 secured to and projecting outwardly from the capsule housing radially inwardly of respective pilings. Capsule guide assembly 204 of FIG. 5 is typical and comprises a capsule guide weldment 278 having a base plate 288 secured by means such as welding to the capsule's outer shell structure 202. The weldment is formed with an outwardly projecting yoke 290 into which the supporting rib 292 of a guide shoe plate 294 is mounted by means of locating pin 296. The guide shoe plate is arcuate in shape for sliding contact with the adjacent piling. The capsule guide weldment is further formed with an opening 298 for receiving the lower end of an elevating hoist cable 300 which is secured to the weldment by means of lockpin 302. Four hoist cables 300 lead upwardly from each guide assembly to respective hydraulically operated elevating hoists 304, 306 mounted on the service platform. The elevating hoists are operated under influence of suitable controls provided within enclosure 195 to raise and lower the capsule to a selected elevation, with the four guide shoe plates maintaining vertical alignment of the capsule with respect to the four pilings.

Means are provided to sink the capsule through the tailings material for excavation of a next lower region. This means includes a plurality, preferably four, of sink jets 308, 310 mounted circumferentially about the capsule's conical shell 210 in an orientation to direct jets of water downwardly to form a slurry with the tailings immediately below the capsule. The weight of the capsule causes this slurry to displace upwardly and flow through the portal openings as the capsule sinks while at the same time the elevating hoist cables are payed out. Operation of the sink jet continues until the capsule reaches the next lower incremental position, for example 20 feet below the first level, whereupon the elevating hoists are locked to stabilize the capsule in position. Water under pressure is supplied to the sink jets by circular manifold piping 312 through four branch conduits 314 with this manifold supplied by piping 316 connected with the water inlet piping through suitable flexible conduits and valving, not shown, operated under influence of controls provided within enclosure 195 on the service platform.

An example of the use and operation of the embodiment of FIGS. 4–5 in the excavation of a tailings pond is as follows: Four 20 inch diameter pipe piles 186, 188 are driven through the pond and into the underlying bedrock, with a 20 foot square service platform 192 constructed across the projecting tops of the piles. An 8 foot wide bridge 194 is constructed from this platform to the pond perimeter. Three stabilizing guy wires are secured to suitable foundations at the perimeter of the pond and tensioned respectively by three winches 193.

Capsule 184 is assembled in situ between the piles by moving four capsule subsections across the bridge to the service platform. Each section is lowered in turn through platform opening 196 for assembly of the complete capsule. The hydraulic power unit and control system is installed within enclosure 195 with flexible hydraulic and electrical lines 216, 217 attached to the capsule. High pressure water inlet piping 198 of 6 inch diameter is installed across the bridge to suitable shore-based pumping equipment capable of supplying water at 1,300 GPM and 400 PSI. Slurry discharge piping 200 of 12 inches diameter is installed along the bridge to a suitable shore-based tailings underflow sump to which the slurry is to be discharged. A flexible inlet line, not shown, is installed between the high pressure inlet piping 198 and piping 316 leading to the sink jets.

Capsule 184 is lowered to its first operating position at which a lower margin of the portals are 20 feet below the pond's initial surface 190 by first actuating the sink jets 308, 310. The water issuing from the sink jets impinges upon the tailings material below the capsule to form a slurry which is displaced upwardly by the weight of the sinking capsule. As the capsule sinks it is stabilized and guided downwardly by the four guide shoes 294. This action continues as the four elevating hoists 304, 306 are payed out. When the first operating position is reached the sink jets are shut down and the elevating hoists locked to secure the capsule in position. Twenty foot sections of pipe 228, 266 for both the inlet and discharge lines are then installed.

With high pressure water supplied to the inlet piping, excavation at the first position is initiated by operating the controls to raise one of the slide gates 242 to open the valve controlling flow to the associated nozzle 220, and to energize the rotary actuator 226 which will oscillate the nozzle and water stream back and forth through an arc of travel extending outwardly through the portal. The high velocity stream impinges upon and forms a slurry with the surrounding tailings material. This slurry flows by gravity through portal opening 218 and into penstock 240 from which it is discharged by pump 250. As excavation progresses the cavity enlarges across the arc of travel of the water jet to the extent that the overburden of tailings collapses by gravity to form additional slurry. When the cavity surrounding the first portal enlarges to the desired extent, flow through the nozzle is shut down and the slide gate is closed. Following this the portions of the tailings extending outwardly from the remaining three portal openings are excavated in successive order by similar steps so that a complete circular volume about the capsule is excavated.

Capsule 184 is prepared for lowering to the next lower region by disconnecting the inlet and discharge piping sections 228, 266. The sink jets are activated to direct high pressure water jets into the tailings to sink the capsule as the elevating hoists are operated to pay out their cables. When the capsule reaches the second operating position at an elevation of 20 feet below that illustrated in FIG. 4, the elevating hoists are locked and sink jet operation is terminated.

Additional 20 foot sections of inlet and discharge piping are then inserted. Horizontal bracing, not shown, is constructed across the four pilings 186, 188 at lower elevations for added support as material is removed from around the piles. At the second operating position the steps described above are repeated for removal of the surrounding volume of tailings.

After excavation is completed, the capsule may be raised by disconnecting and removing one or more sections of both the inlet and discharge piping and then operating the elevating hoist. For example, the capsule would be raised where the tailings pond is again being filled with material. Also, additional excavation installations within the same pond may be provided by constructing similar groups of four pilings, erecting additional service platforms and service bridges, and using one capsule for the overall operation. Thus, following excavation at one installation the same capsule would be disassembled and transported for assembly and operation at a second installation.

While the embodiment of FIGS. 4, 5 illustrate apparatus and method in which the capsule, when excavating at each vertical operating position, is fixed with respect to the piles, the invention also contemplates a construction which accommodates minor changes in elevation between the capsule and pilings as excavation proceeds. For example, the inlet and discharge piping sections between elbow fittings 230, 268 and the capsule could be of telescoping design. In addition, the inlet and discharge piping sections could be replaced by a swivel joint X design to permit the capsule to undergo changes in elevation with respect to the pilings. For ocean mining the pilings could be replaced in function by a nose cone stabilizing spud so that the capsule could operate independently at greater depths with suitable inlet and discharge conduits and power and control cables extending to a surface vessel.

It is apparent that there has been provided in the invention new method and apparatus which facilitates the excavation of a settled body of material such as a tailings pond through operations which proceed downwardly from the surface. The embodiment of FIGS. 1–3 provide a caisson with attached pilings. In the embodiment of FIGS. 4, 5 a capsule moves relative to fixed pilings, and the excavating operation may be controlled as the cavity area increases by progressively lowering the capsule to the desired depth. In addition, the provision of the fixed service platform and access bridge facilitates maintenance or repair of the equipment, and in particular the capsule can be hoisted to the service platform at any time. Moreover, the capability of hoisting the capsule obviates problems which could arise due to flooding and compaction of slurry within the water jet and pump compartment.

While the foregoing embodiments are at present considered to be preferred for use in the excavation of a tailings pond, it is understood that numerous variations and modifications may be made therein by those skilled in the art and that the invention will find application in removing settled bodies of material of the foregoing nature confined in any relatively large body, container or vessel, and it is intended to cover in the appended claims all such variations, applications and fields of use as fall within the true spirit and scope of the invention.

We claim:

1. A method for removing a settled body of discrete mineral solids including the steps of directing a stream of liquid through at least one nozzle substantially laterally into a first pulping zone, the nozzle being located at a first predetermined elevation below the upper surface of said body whereby the liquid forms a pumpable slurry with the mineral solids in said zone, pumping the slurry from the zone, traversing the liquid stream through a predetermined path in said zone to form an undercut cavity in said body sufficient to collapse the overburden of mineral solids overlying said cavity, causing the collapsed overburden of mineral solids to be formed into additional pumpable slurry with said liquid, pumping the additional slurry from said zone, directing additional liquid to a region below said nozzle to cause the same to sink downwardly through said solids to a second predetermined elevation below said first elevation, directing said stream of liquid into a second pulping zone located at said second elevation, and repeating said steps of pumping the slurry from said second zone, traversing the liquid stream through a predetermined path in said second zone to form an additional undercut cavity sufficient to collapse the overburden of mineral solids thereabove, causing the collapsed overburden to be formed into additional pumpable slurry with said liquid, and pumping the additional slurry away from said second zone.

2. A method as in claim 1 in which the stream of liquid is moved successively to a plurality of regions each located at successive elevations below said first elevation, and the mineral solids within each region are removed by repeating in each region the steps of directing streams of liquid into pulping zones to form a pumpable slurry, pumping the slurry from the zones, traversing the streams through predetermined paths in the zones to cause collapse of overburden in the regions, causing the collapsed overburden to be formed into additional pumpable slurry, and pumping the additional slurry from the respective zones.

3. A method of removing a settled body of discrete mineral solids capable of being formed into a pumpable slurry by nozzle means and slurry pump means *which are mounted within a housing structure*, including the steps of establishing the nozzle means and slurry pump means in the body with the nozzle means located at a first predetermined elevation below the upper surface of said body, [directing] *moving* at least one stream of liquid from said nozzle means [into a path] *back and forth relative to the housing through an arc* extending substantially laterally therefrom to define a pulping zone whereby the liquid forms a pumpable slurry with the solids within said zone, pumping the slurry from the zone with said slurry pump means until the solids within the region adjacent said nozzle means are substantially removed, directing additional liquid into a region underlying said structure to form additional pumpable slurry with the mineral solids and pumping the additional slurry away from said underlying region to sink the nozzle means and slurry pump means downwardly to a second region with said nozzle means located at a second predetermined elevation below said first elevation, and repeating the steps of [directing] *moving* at least one liquid stream from said nozzle means into a path to define an additional pulping zone and pumping slurry from said additional zone until the solids within said second region are substantially removed.

4. A method as in claim 3 in which the settled body comprises a tailings pond associated with an ore mining operation, and said steps are repeated in a plurality of regions of the pond to remove the mineral solids therefrom.

[5. A method as in claim 3 in which said structure includes a caisson, and said caisson is stabilized by a plurality of pilings positioned circumferentially around said caisson and extending vertically into the body of mineral solids adjacent thereto, and the step of moving the nozzle means and slurry pump means includes directing liquid into regions adjacent to and underlying said pilings whereby the liquid forms a slurry with the mineral solids therein sufficient to allow the pilings to sink by gravitational action with the caisson through the slurry thus formed.]

6. A method as in claim 3 in which said structure includes means defining a sump positioned at the lower end of the structure and means forming a portal opening in the structure to direct slurry into said sump, including the steps of directing said stream of liquid through said openings to establish said pulping zone laterally adjacent the openings, causing said pumpable slurry to flow by gravitational action from the pulping zone through the portal openings and into said sump, and causing the slurry in the sump to be pumped to a zone remote from the structure.

7. A method as in claim 3 in which said structure includes a capsule, and said capsule is mounted for vertical movement with respect to a plurality of stabilizing pilings positioned circumferentially around said capsule and extending vertically into the body of mineral solids adjacent thereto, and the step of moving the nozzle means and slurry pump means includes directing liquid into regions adjacent to and underlying said capsule whereby the liquid forms a slurry with the mineral solids therein sufficient to allow the capsule to sink downwardly by gravitational action relative to the pilings.

8. Apparatus for removing discrete mineral solids from a settled body of the same comprising a *caisson* structure having a side wall, a lower end adapted to extend below the upper surface of the body when the structure is positioned therein, *stabilizing means for supporting the caisson structure at a selected region within the body*, means forming a portal opening through the sidewall providing fluid communication from a region of the body surrounding said portal opening means into said lower end, nozzle means *mounted within the caisson structure* forming a stream of liquid extending substantially laterally outwardly through the portal opening means into said region, *means for moving the nozzle means with respect to the caisson structure to move the liquid stream in alternate rotational directions across an arc* whereby the liquid forms a pumpable slurry with the solids within a portion of said region defining a pulping zone, and means to pump said slurry to a zone remote from the structure.

9. Apparatus as in claim 8 *in* which [includes] *said stabilizing* means [to stabilize] *supports* said structure within said body with said structure lowered in position at said first predetermined elevation below the upper surface of said body, and means to move said structure downwardly to a second elevation below said first elevation whereby operation of the nozzle means and slurry pump means removes mineral solids from a second region of said body below said first region.

10. Apparatus as in claim 9 in which said structure includes a caisson carrying said nozzle means and slurry pump means, and said stabilizer means comprises a plurality of pilings secured to said caisson and circumferentially positioned therearound to extend vertically into said body of solids whereby said caisson and pilings move downwardly together.

11. Apparatus as in claim 9 in which said structure includes a capsule carrying said nozzle means and slurry pump means, and said stabilizer means comprises a plurality of pilings circumferentially arranged around said capsule and extending vertically into said body of solids, together with means mounting said capsule for vertical movement with respect to said pilings.

12. Apparatus as in claim 11 which includes means forming a platform at the upper ends of said pilings, together with hoist means on the platform to raise and lower said capsule.

13. Apparatus as in claim 12 which includes means forming a service bridge extending from said platform to the perimeter of said body.

14. Apparatus as in claim [9] *11* in which said means mounting said capsule for movement with respect to said pilings includes guide means comprising a plurality of guide shoes mounted for movement with said capsule, each guide shoe extending radially outwardly from the capsule into sliding contact with the outer surface of respective ones of said pilings.

[15. Apparatus as in claim 9 in which the means to move the structure downwardly comprises means to direct at least one stream of liquid into a region adjacent to and underlying said structure lower end whereby said liquid forms a pumpable slurry with the solids in said underlying region and the pump means pumps said last mentioned slurry so that the structure sinks by gravitational action into the volume of the underlying region from which said slurry is removed.]

16. Apparatus as in claim [15] *9* in which [said structure includes a caisson] *the means to move the structure downwardly comprises means to direct at least one stream of liquid into a region adjacent to and underlying said structure lower end whereby said liquid forms a pumpable slurry with solids in said underlying region and the pump means pumps said last mentioned slurry so that the structure sinks by gravitational action into the volume of the underlying region from which said slurry is removed* and said stabilizer means comprises a plurality of circumferentially positioned pilings mounted for movement with the caisson in vertical alignment therewith and having respective lower ends extending below said body upper surface, and the means to move the caisson downwardly includes means to direct a stream of liquid in respective regions adjacent to and underlying said piling lower ends whereby said liquid forms a slurry with the solids in said underlying piling regions whereby said caisson and pilings sink together by gravitational action.

[17. Apparatus as in claim 8 in which said sidewall comprises an elongate hollow shell having its longitudinal axis adapted to be disposed vertically in said body of solids, and said means forming the portal opening includes at least one opening in said shell adjacent the caisson lower end.]

[18. Apparatus as in claim 17 in which the nozzle means comprises at least one nozzle mounted within said shell to direct a liquid stream outwardly through said portal opening means along a path extending substantially laterally from the caisson to define said pulping zone.]

19. Apparatus as in claim 8 in which said portal opening means includes an uppermost opening through which said liquid streams extend, together with means forming a grating positioned below said opening and through which said slurry flows to the pump means, said grating comprising a plurality of vertically extending, laterally spaced apart bars.

20. Apparatus as in claim 8 in which the means to pump the slurry includes a sump formed in said structure lower end substantially below said portal opening means whereby slurry flows by gravitational action through said portal opening means into said sump and said means to pump said slurry includes an inlet communicating with said sump and an outlet adapted to discharge pumped slurry upwardly through said structure.

21. Apparatus as in claim 20 wherein said structure forms a substantially water-tight chamber position above said portal opening means, together with pump operating means mounted within said chamber connected to power said slurry pump means.

22. Apparatus for removing discrete mineral solids from a settled body of the same comprising *a caisson*, means forming a slurry receiving pump *in the caisson*, portal means *in the caisson* for directing slurry into said sump, pump means for pumping slurry from said sump to a zone remote therefrom, nozzle means mounted above said sump for directing liquid streams laterally into the mineral solids to form a slurry therewith, said nozzle means being supported within a diameter of the path of travel defined by the movement of said [sump] *caisson* through said settled body, means for directing liquid under pressure to said nozzle means, *means for rotating the nozzle means with respect to said caisson*, means for supporting said [sump and nozzle means] *caisson* at predetermined elevations within said settled body, and means for injecting additional liquid into the mineral solids below said [sump] *caisson* to form additional slurry through which said [sump and nozzle means are] *caisson is* caused to sink.

23. Apparatus as in claim 22 in which the support means includes means for progressively lowering said sump and nozzle means while said additional liquid is being injected below said sump for controlling the elevation to which said sump and nozzle means are lowered through the settled body.

24. Apparatus as in claim 23 in which said portal means is positioned at an elevation below said nozzle means for receiving slurry which is formed by the liquid from the nozzle means.

*25. A method of removing a settled body of discrete mineral solids capable of being formed into a pumpable slurry by nozzle means and slurry pump means which are mounted within a housing structure, said structure including a caisson, and said caisson is stabilized by a plurality of pilings positioned circumferentially around said caisson and extending vertically into the body of mineral solids adjacent thereto, including the steps of establishing the nozzle means and slurry pump means in the body with the nozzle means located at a first predetermined elevation below the upper surface of said body, directing at least one stream of liquid from said nozzle means into a path extending substantially laterally therefrom to define a pulping zone whereby the liquid forms a pumpable slurry with solids within said zone, pumping the slurry from the zone with said slurry pump means until solids within the region adjacent said nozzle means are substantially removed, directing additional liquid into a region underlying said structure to form additional pumpable slurry with the mineral solids and pumping the additional slurry away from said underlying region to sink the nozzle means and slurry pump means downwardly to a second region with said nozzle means located at a second predetermined elevation below said first elevation, the step of sinking the nozzle means and slurry pump means including directing liquid into regions adjacent to and underlying said pilings whereby the liquid forms a slurry with the mineral solids therein sufficient to allow the pilings to sink by gravitational action with the caisson through the slurry thus formed, and repeating the steps of directing at least one liquid stream from said nozzle means into a path to define an additional pulping zone and pumping slurry from said additional zone until the solids within said second region are substantially removed.*

* * * * *